US008090096B2

United States Patent
Nitobe et al.

(10) Patent No.: US 8,090,096 B2
(45) Date of Patent: Jan. 3, 2012

(54) TILTING MECHANISM AND ELECTRONIC APPARATUS

(75) Inventors: Kenji Nitobe, Hamura (JP); Shinichi Yoshida, Hachioji (JP); Akira Sugiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1029 days.

(21) Appl. No.: 11/972,149

(22) Filed: Jan. 10, 2008

(65) Prior Publication Data

US 2008/0267389 A1 Oct. 30, 2008

(30) Foreign Application Priority Data

Apr. 25, 2007 (JP) ................................. 2007-116173

(51) Int. Cl.
*H04M 1/00* (2006.01)
*H04M 9/00* (2006.01)

(52) U.S. Cl. .................... 379/428.01; 379/436; 379/446

(58) Field of Classification Search ............ 379/428.01–428.04, 436, 441, 379/445–447, 454; 248/126, 133, 685, 688
See application file for complete search history.

(56) References Cited

U.S. PATENT DOCUMENTS

| 6,215,869 B1 * | 4/2001 | Frank et al. | 379/428.01 |
| 6,781,821 B2 * | 8/2004 | Tsubai | 379/29.1 |
| 7,104,516 B2 * | 9/2006 | Uto et al. | 248/688 |

FOREIGN PATENT DOCUMENTS

| JP | 07045965 | 2/1995 |
| JP | 10150485 | 6/1998 |
| JP | 2003087382 | 3/2003 |

* cited by examiner

*Primary Examiner* — Tuan Nguyen
(74) *Attorney, Agent, or Firm* — Pillsbury Winthrop Shaw Pittman, LLP (57) ABSTRACT

According to one embodiment, a tilting mechanism includes a fixed section including a guide surface depressed in an arc shape; and a movable section having an outer peripheral surface curved in an arc shape that comes in contact with the guide surface of the fixed section and tilting along the guide surface, the movable section including a concave portion cut out to open the outer peripheral surface, wherein the concave portion includes a pair of side surfaces opposed to each other; and guide grooves that are curved along a curvature of the outer peripheral surface of the movable section and are formed on the side surfaces; and the fixed section includes a plurality of shafts that are slidably fitted into the guide grooves.

14 Claims, 12 Drawing Sheets

TILTING MECHANISM AND ELECTRONIC APPARATUS

CROSS-REFERENCE TO RELATED APPLICATIONS

This application is based upon and claims the benefit of priority from Japanese Patent Application No. 2007-116173, filed Apr. 25, 2007, the entire contents of which are incorporated herein by reference.

BACKGROUND

1. Field

One embodiment of the invention relates to a tilting mechanism for varying a tilt angle of a movable section with respect to a fixed section. In addition, another embodiment of the invention relates to an electronic apparatus such as a telephone in which a main body having a hand set and a display unit on a base thereof is tiltably attached, and more particularly, to a structure for varying a tilt angle of the main body with respect to the base.

2. Description of the Related Art

In an electronic apparatus such as a television-incorporated telephone set disclosed in JP-A-10-150485, the television includes a communication block and a display block mounted on the communication block.

The communication block generally contains a circuit component for a telephone communication and various operation buttons related to a telephone communication function are arranged on a front surface of the communication block. The display block generally contains a circuit component for a television or a CRT display and a display screen of the CRT display is exposed on a front surface of the display block.

In such an electronic apparatus, the display block can be tilted with respect to the communication block so that users can adjust a display screen at their disposal.

Specifically, the upper surface of the communication block is curved in an arc shape so as to be concaved, and a roller is rotatably supported by four corners of the curved part. On the other hand, the lower surface of the display block forms a sliding surface that is curved in an arc shape to protrude, and the roller rotatably comes in contact with the sliding surface. For this reason, the display block is configured to be tilted with respect to the communication block as the arc-shaped sliding surface is slided on the roller.

In addition, according to JP-A-10-150485, a click mechanism is disposed between the communication block and the display block. The click mechanism includes a plurality of concave portions formed on the sliding surface of the display block and a locking piece formed on the upper surface of the communication block.

The concave portions are arranged in a row at a predetermined interval in the tilting direction of the display block. The locking piece is elastic and a convex portion positioned on the front end thereof selectively engages with the concave portions of the display block. With such a configuration, the display block is maintained at any tilt angle so that the display screen faces a desired direction.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a tilting mechanism includes: a fixed section including a guide surface depressed in an arc shape; and a movable section having an outer peripheral surface curved in an arc shape that comes in contact with the guide surface of the fixed section and tilting along the guide surface, the movable section including a concave portion cut out to open the outer peripheral surface, wherein: the concave portion includes: a pair of side surfaces opposed to each other; and guide grooves that are curved along a curvature of the outer peripheral surface of the movable section and are formed on the side surfaces; and the fixed section includes a plurality of shafts that are slidably fitted into the guide grooves. Further, according to another embodiment of the invention, a tilting mechanism includes: a fixed section including: a pair of guide surfaces depressed in an arc shape; and a plurality of shafts positioned between the guide surfaces; a movable section including: an outer peripheral surface curved in an arc shape that comes in contact with the guide surfaces of the fixed section; a concave portion that is cut out to open the outer peripheral surface and has a pair of side surfaces opposed to each other; guide grooves that are formed on the side surfaces of the concave portion and curved along a curvature of the outer peripheral surface of the movable section and that allow the shafts to be slidably fitted thereto; and a plurality of engagement portions that are formed on the side surfaces of the concave portion and disposed at a predetermined interval in a longitudinal direction of the guide grooves; and a lock member that is supported by the fixed section and revolvable between an engagement position at which the lock member selectively engages with the engagement portion and a disengagement position at which the lock member is disengaged from the engagement portion. Further, according to another embodiment of the invention, an electronic apparatus includes: a base including: a pair of guide surfaces depressed in an arc shape; and a plurality of shafts positioned between the guide surfaces; a main body including: an outer peripheral surface curved in an arc shape that comes in contact with the guide surfaces of the base; a concave portion cut out to open the outer peripheral surface and includes a pair of side surfaces opposed to each other; guide grooves that are formed on the side surfaces of the concave portion and curved along a curvature of the outer peripheral surface of the main body and that allow the shafts to be slidably fitted thereto; and a plurality of engagement portions that are formed on the side surfaces of the concave portion and disposed at a predetermined interval in a longitudinal direction of the guide grooves; and a lock member that is supported by the base and revolvable between an engagement position at which the lock member selectively engages with the engagement portion and a disengagement position at which the lock member is disengaged from the engagement portion.

Hereinafter, an embodiment of the invention will be described with reference to FIGS. 1 to 13.

Figure 1:
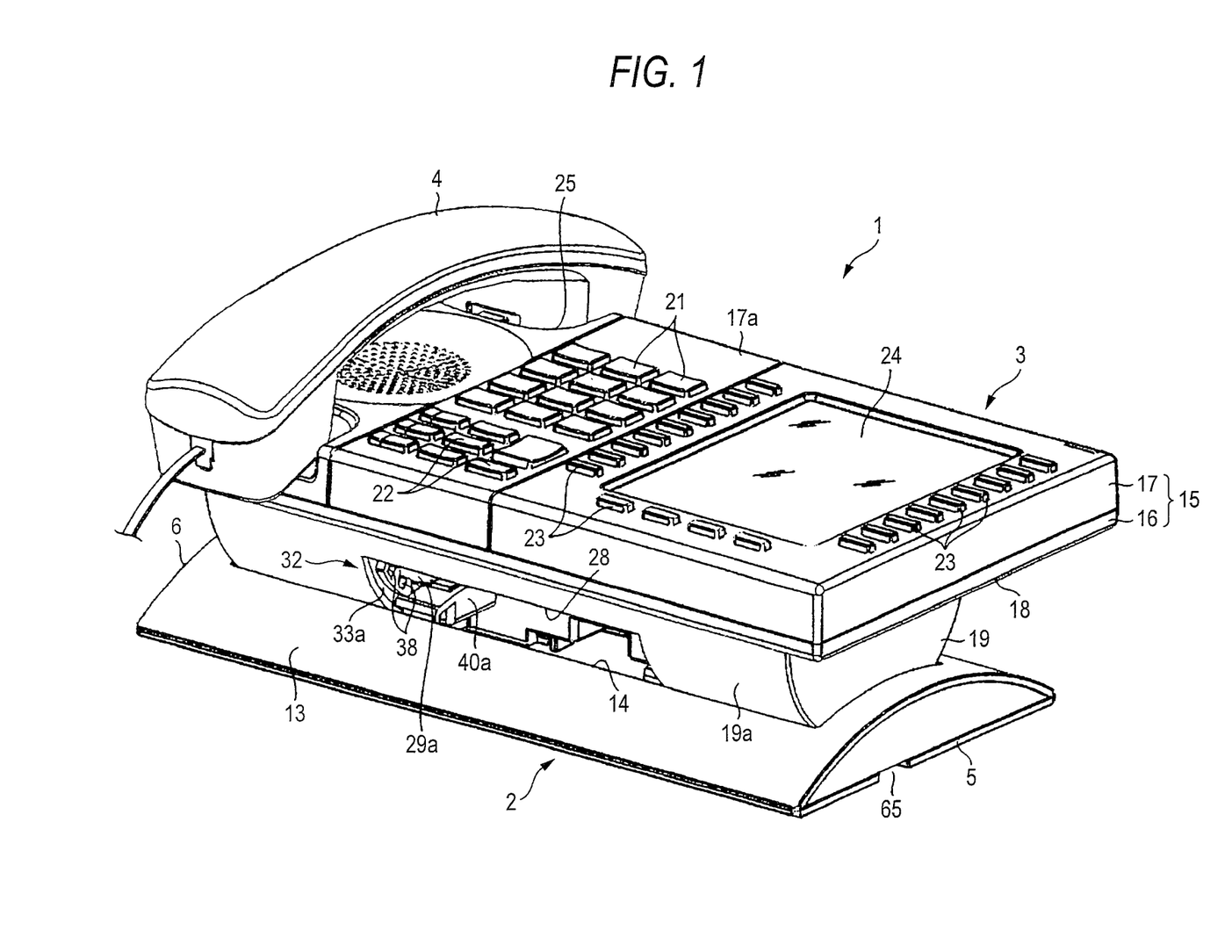
FIG. 1 is a perspective view showing a telephone according to an embodiment of the invention when viewed from the front side thereof.
Figure 2:
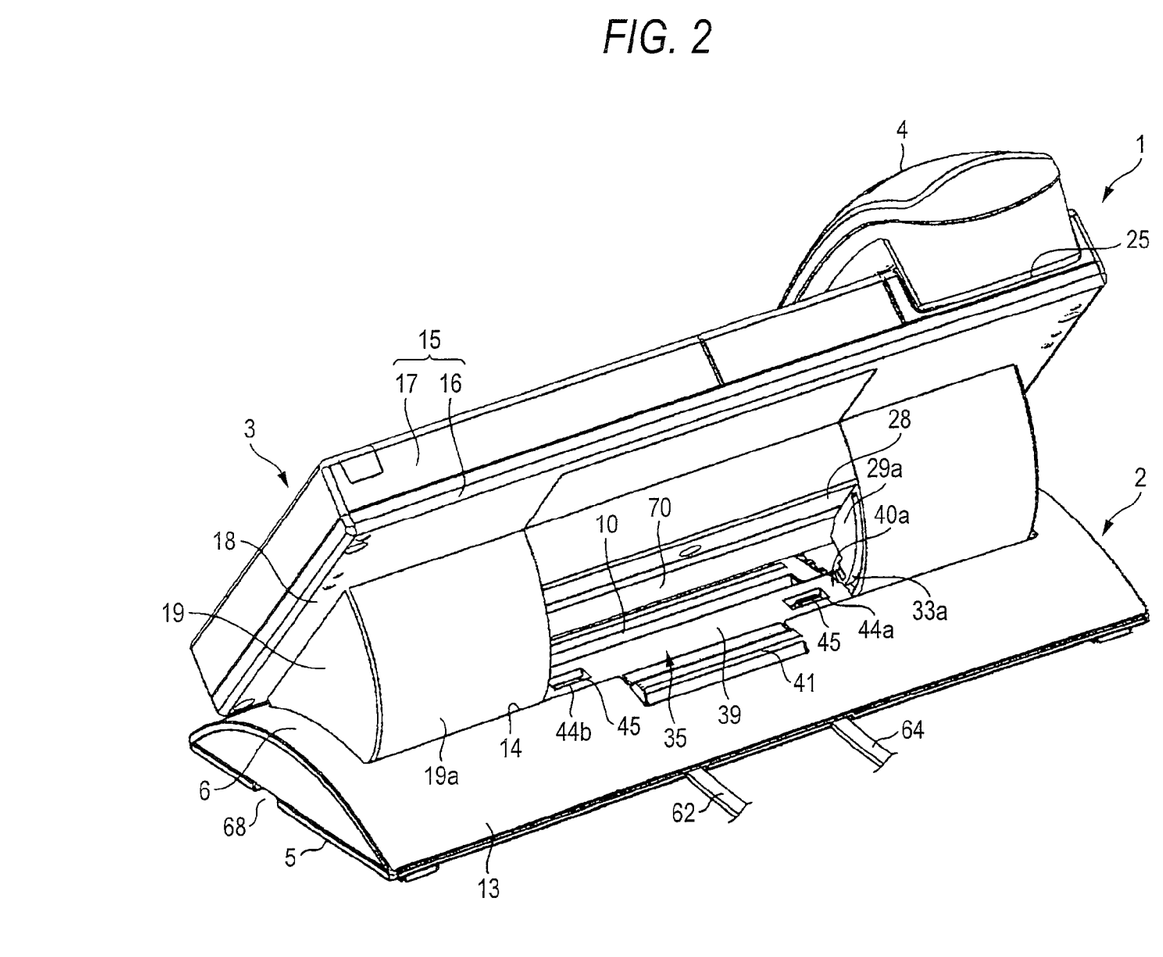
FIG. 2 is a perspective view showing the telephone according to the embodiment of the invention when viewed from the rear side thereof.

FIGS. 1 and 2 show a telephone 1 as an example of an electronic apparatus. The telephone 1 related to the embodiment can be used for a general usage in an office or a household. For example, the telephone 1 may be used while being placed on a desk or hung on a wall.

The telephone 1 includes a base 2, a main body 3 of the apparatus, and a handset 4. For example, the base 2 is an example of a fixed section disposed on the desk and includes a bottom plate 5 and a top cover 6.

Figure 3:
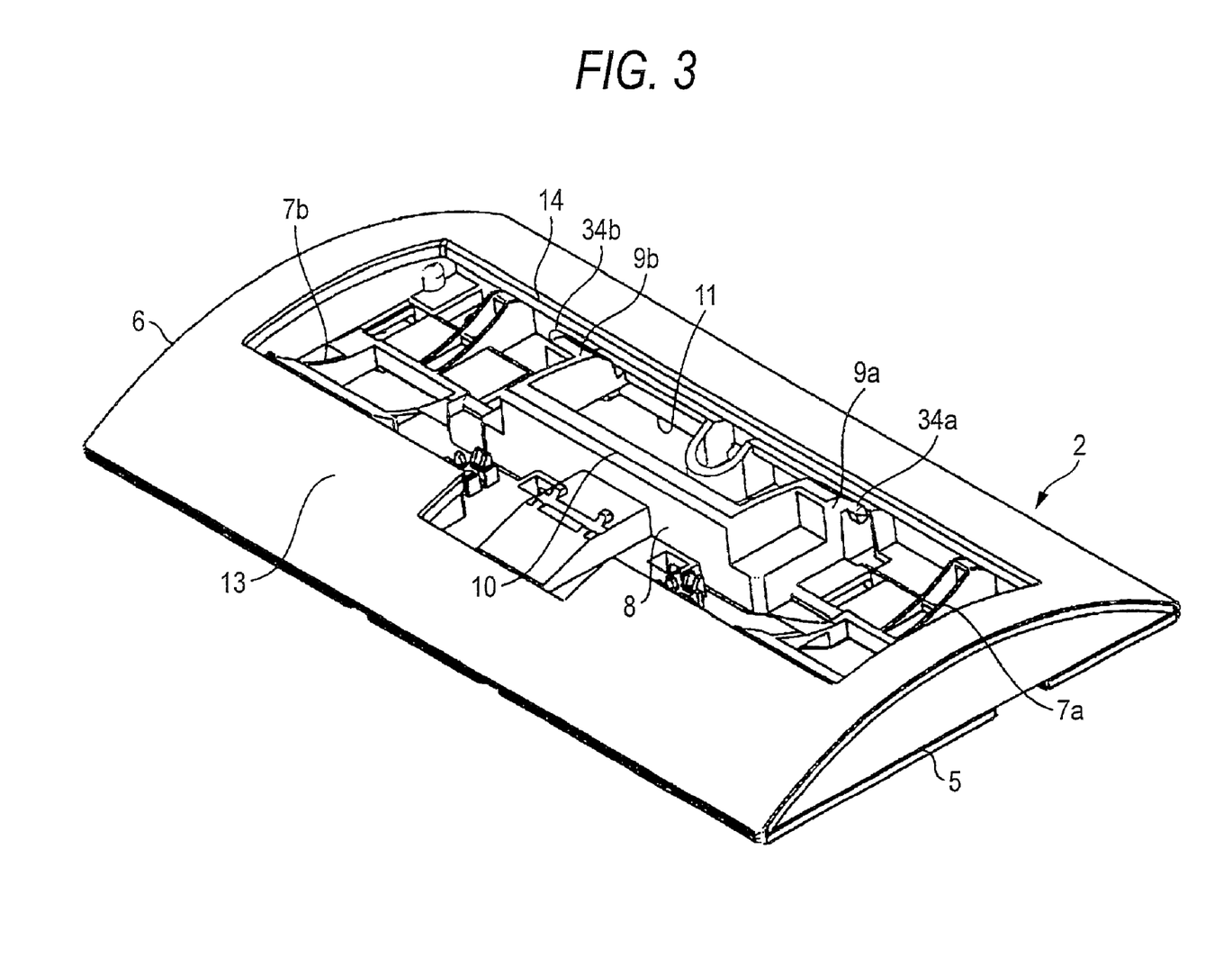
FIG. 3 is a perspective view showing a base serving as a fixed section in the embodiment of the invention.

The bottom plate 5 is rectangular in shape. As shown in FIG. 3, a pair of guide surfaces 7a and 7b and a convex portion 8 are formed on the upper surface of the bottom plate 5. The guide surfaces 7a and 7b are positioned on the left and right ends of the base 2, respectively, and are curved in an arc shape so as to be concaved.

The convex portion 8 that protrudes upward from the bottom plate 5 is positioned between the guide surfaces 7a and 7b. The convex portion 8 includes left and right side-walls 9a and 9b and an upright wall 10. The side-walls 9a and 9b is spaced in the width direction of the base 2 and extends in the depth direction of the base 2. The upright wall 10 extends in the width direction of the base 2 so as to be suspended between the rear ends of the side-walls 9a and 9b. In addition, a through-hole 11 is formed on an area surrounded by the side-walls 9a and 9b and the upright wall 10 in the bottom plate 5.

The top cover 6 includes an upper wall 13 for covering the upper part of the bottom plate 5. The upper wall 13 is curved in an arc shape so as to be convexed upward. An opening 14 is formed at the center portion of the upper wall 13. The opening 14 has a rectangular opening shape which extends in the width direction of the base 2 and the guide surfaces 7a and 7b and the convex portion 8 are positioned inside the opening 14.

The main body 3 is an example of a movable section and is tiltably supported by the base 2 within a predetermined angle.

The main body 3 includes a box-shaped housing 15. The housing 15 includes a bottom case 16 and a top cover 17.

Figure 4:
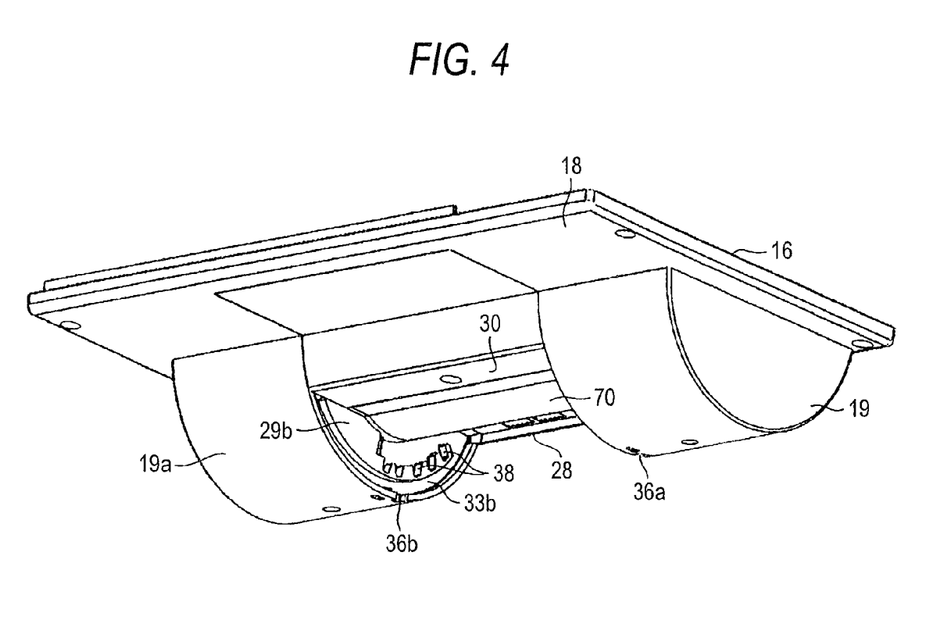
FIG. 4 is a perspective view showing a bottom case constituting a movable section in the embodiment of the invention.

The bottom case 16 includes a rectangular bottom plate 18 and a leg section 19 protruding downward from the bottom plate 18. The leg section 19 is formed in a semi-cylindrical shape so as to extend in the width direction of the main body 3. For this reason, the leg section 19 includes an outer peripheral surface 19a which is curved in an arc shape. A curvature of the outer peripheral surface 19a of the leg section 19 corresponds to that of the guide surfaces 7a and 7b of the base 2.

The top cover 17 is formed in a rectangular flat box-like shape which is opened toward the bottom case 16. The top cover 17 is connected to the outer periphery edge of the bottom plate 18 of the bottom case 16 and covers the upper part of the bottom case 16.

The top cover 17 includes a flat upper surface 17a. A plurality of dial buttons 21, a plurality of fixed function buttons 22, and a plurality of free assign button 23 are disposed on the upper surface 17a of the top cover 17. In addition, an LCD display portion 24 is disposed on the upper surface of the top cover 17. For example, the LCD display portion 24 indicates a telephone number, a calendar, a time, a calling/receiving state, and contents that are individually set in the free assign button 23.

A handset placing portion 25 is formed on the left end portion of the upper surface 17a of the top cover 17. The handset 4 is disposed on the handset placing portion 25.

Figure 5:
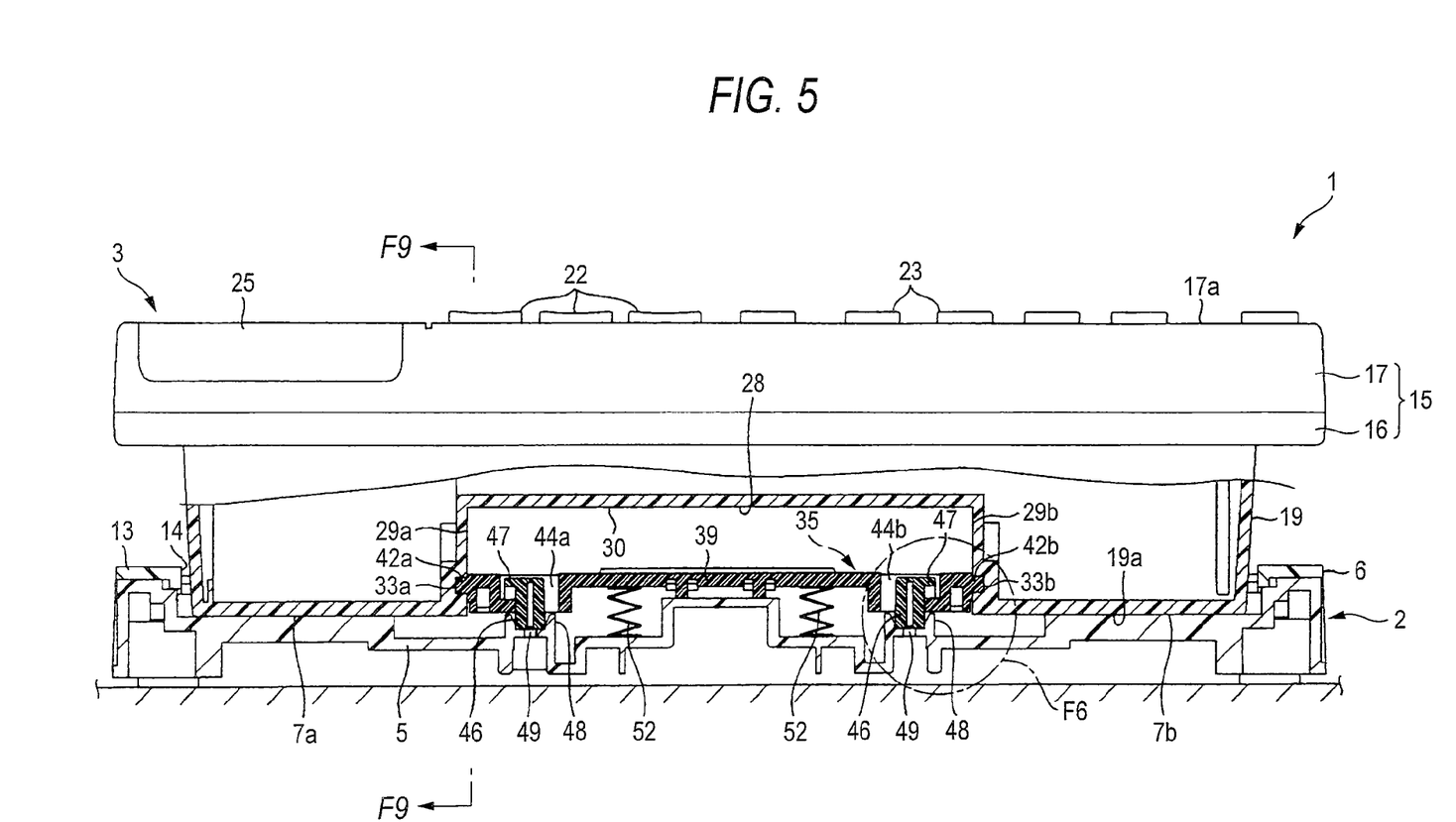
FIG. 5 is a sectional view showing a position relation of the base and a concave portion and a lock lever of a main body in the embodiment of the invention.

As shown in FIG. 5, in the leg section 19 of the main body 3, a part of the outer peripheral surface 19a is inserted in the opening 14 of the base 2. A part of the outer peripheral surface 19a of the leg section 19 comes in sliding-contact with the guide surfaces 7a and 7b of the base 2. For this reason, the main body 3 is configured to be tiltable along the guide surfaces 7a and 7b.

As shown in FIGS. 2, 4, and 5, the leg section 19 of the main body 3 includes a concave portion 28 in which the outer peripheral surface 19a is cut out for an opening. The concave portion 28 is disposed on the center portion in the longitudinal direction of the leg section 19 and the convex portion 8 of the base 2 is placed inside the concave portion 28.

The concave portion 28 includes a pair of left and right side surfaces 29a and 29b and a ceiling surface 30. The side surfaces 29a and 29b are opposed to each other in the width direction of the main body 3. One side surface 29a of the concave portion 28 is adjacent to one side surface 9a of the convex portion 8 and the other side surface 29b of the concave portion 28 is adjacent to the other side surface 9b of the convex portion 8. The ceiling surface 30 is suspended between the side surfaces 29a and 29b so as to face the opening 14 of the base 2.

Figure 9:
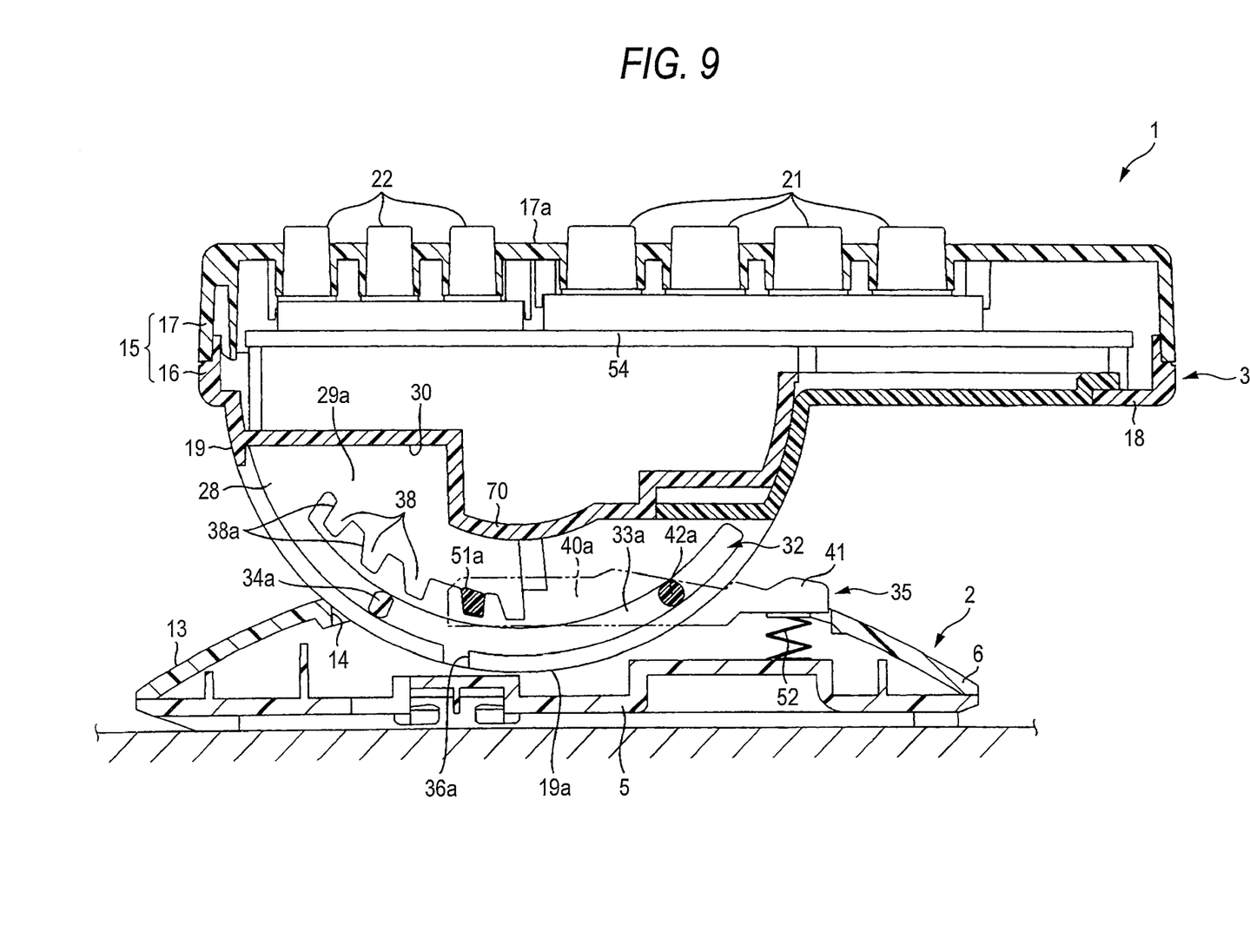
FIG. 9 is a sectional view showing the telephone taken along Line F9-F9 in FIG. 5.
Figure 11:
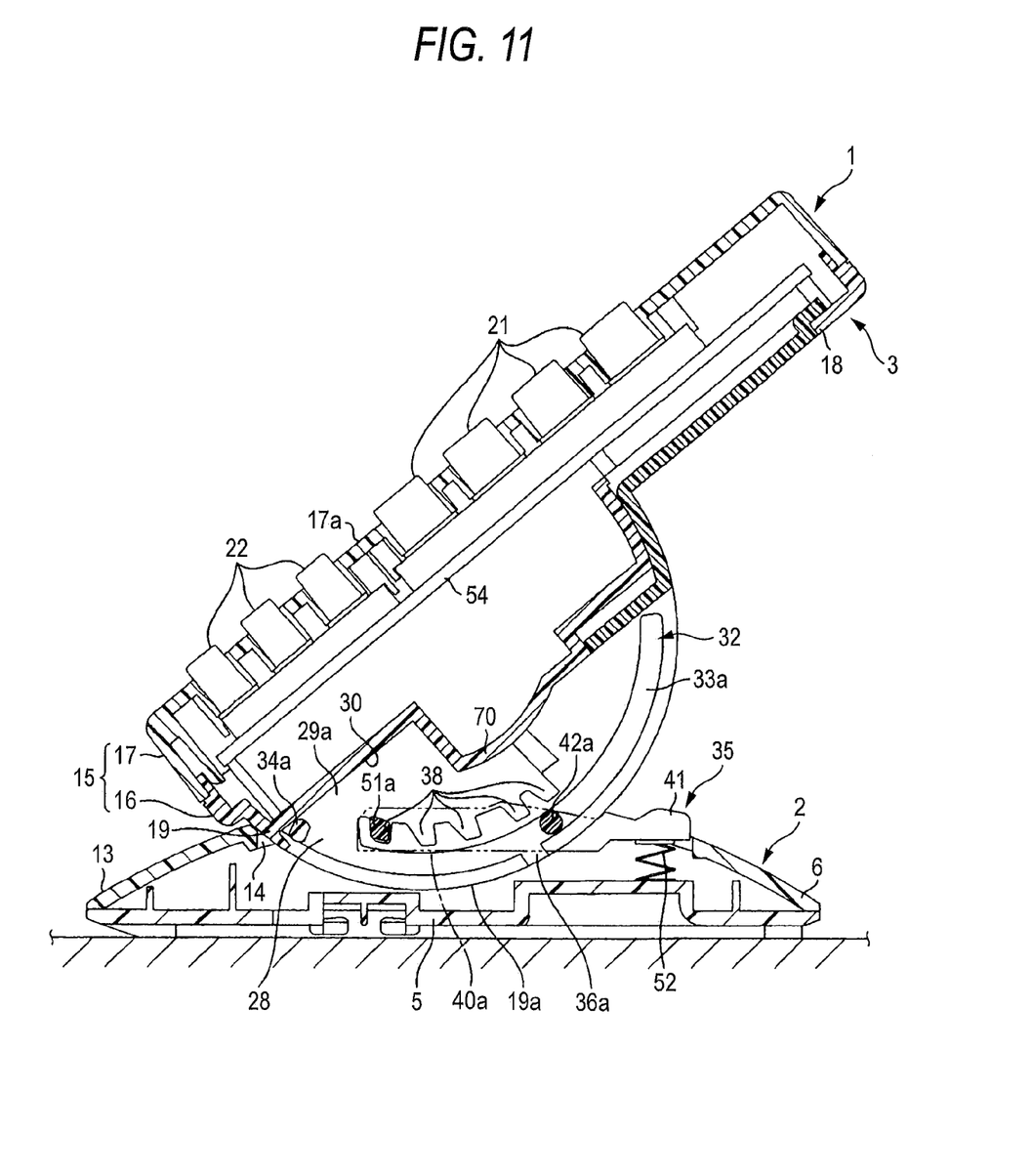
FIG. 11 is a sectional view showing the telephone in the state where the main body is erected at a desired tilt angle in the embodiment of the invention.

As shown in FIGS. 5, 9, and 11, the main body 3 is tiltably supported by the base 2 with a tilting mechanism 32 interposed therebetween. The tilting mechanism 32 includes a pair of guide grooves 33a and 33b, a pair of shafts 34a and 34b, and a lock lever 35.

The guide grooves 33a and 33b are formed on the side surfaces 29a and 29b of the concave portion 28, respectively, and exposed in the concave portion 28. The guide grooves 33a and 33b are curved in an arc shape so as to follow the guide surfaces 7a and 7b of the base 2. Cutouts 36a and 36b are formed on a corner portion formed by the outer peripheral surface 19a of the leg section 19 and the side surfaces 29a and 29b of the concave portion 28, respectively. The cutouts 36a and 36b are opened at the position slightly apart from the summit of the outer peripheral surface 19a of the leg section 19 and connect the outer peripheral surface 19a to the guide grooves 33a and 33b.

The shafts 34a and 34b of the base 2 horizontally protrude from the side surfaces 9a and 9b of the convex portion 8 to the side surfaces 29a and 29b of the concave portion 28 so as to be disposed on the same shaft. The shafts 34a and 34b are guided toward the guide grooves 33a and 33b via the cutouts 36a and 36b so as to be slidably fitted into the guide grooves 33a and 33b. With such a fitting operation, the main body 3 is configured to be tiltable along the guide grooves 33a and 33b.

As shown in FIGS. 4 and 9, five engagement portions 38 are formed on each of the side surfaces 29a and 29b of the concave portion 28. The engagement portions 38 are positioned above each of the guide grooves 33a and 33b. The engagement portions 38 include cutouts which are opened to the upper side of the guide grooves 33a and 33b and are arranged at a predetermined interval so as to follow the groove direction of the guide grooves 33a and 33b. The engagement portions 38 are arranged at a pitch of 10° in the curved direction of the guide grooves 33a and 33b so as to adjust the tilt angle of the main body 3 through, for example, five steps every 10°.

In addition, according to the embodiment, the front edge 38a positioned on the front side of the main body 3 among the engagement portions 38 is inclined to the front side of the main body 3 in the direction from the bottom of the engagement portion 38 to the opening end thereof.

The lock lever 35 is an example of a lock member for keeping the main body 3 at a desired tilt angle. As shown in FIG. 2, the lock lever 35 is received in the opening 14 of the base 2 so as to be positioned between the side surfaces 29a and 29b of the concave portion 28.

Figure 8:
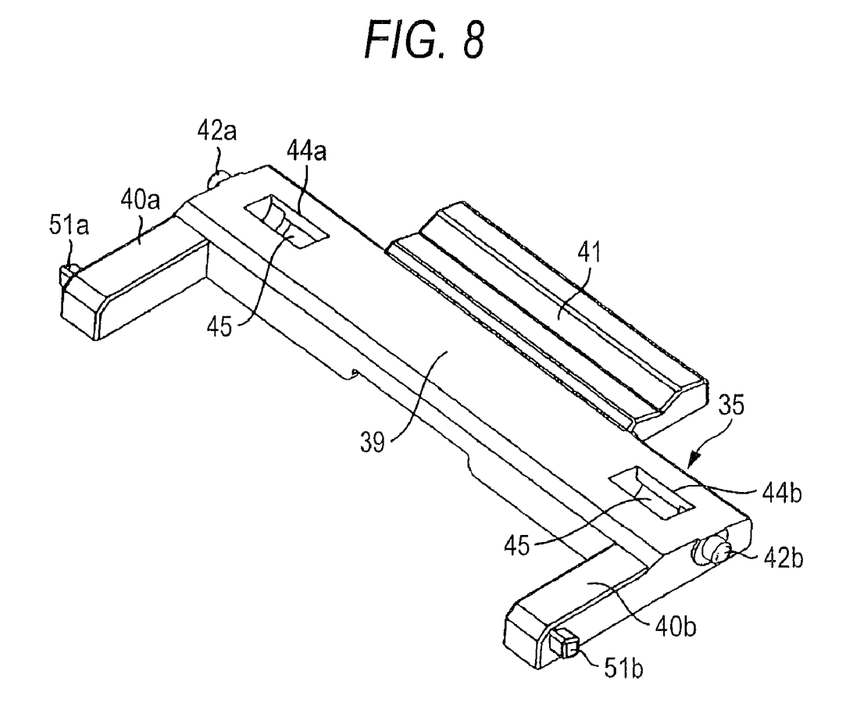
FIG. 8 is a perspective view showing the lock lever for keeping the main body at a desired tilt angle in the embodiment of the invention.

As shown in FIG. 8, the lock lever 35 includes a base portion 39 and a pair of arm portions 40a and 40b. The base portion 39 is formed in a thin and long plate shape which is suspended between the side surfaces 29a and 29b of the concave portion 28 and positioned on the rear end portion of the opening 14. The base portion 39 includes a push button 41 on which users of the telephone 1 pushes with their hands. The push button 41 protrudes from the base portion 39 toward the rear side of the opening 14 and exposed on the upper surface of the top cover 6 of the base 2.

Guide shafts 42a and 42b are formed on both ends in the longitudinal direction of the base portion 39. The guide shafts 42a and 42b horizontally protrudes from the both ends of the base portion 39 toward the side surfaces 29a and 29b of the concave portion 28 and disposed on the same axis. The guide shafts 42a and 42b are guided from the cutouts 36a and 36b to the guide grooves 33a and 33b so as to be slidably fitted into the guide grooves 33a and 33b. The guide shaft 42a of the lock lever 35 and the shaft 34a of the base 2 are spaced from the guide shaft 42b of the lock lever 35 and the shaft 34b of the base 2 in the groove direction of the guide grooves 33a and 33b, respectively.

Figure 6:
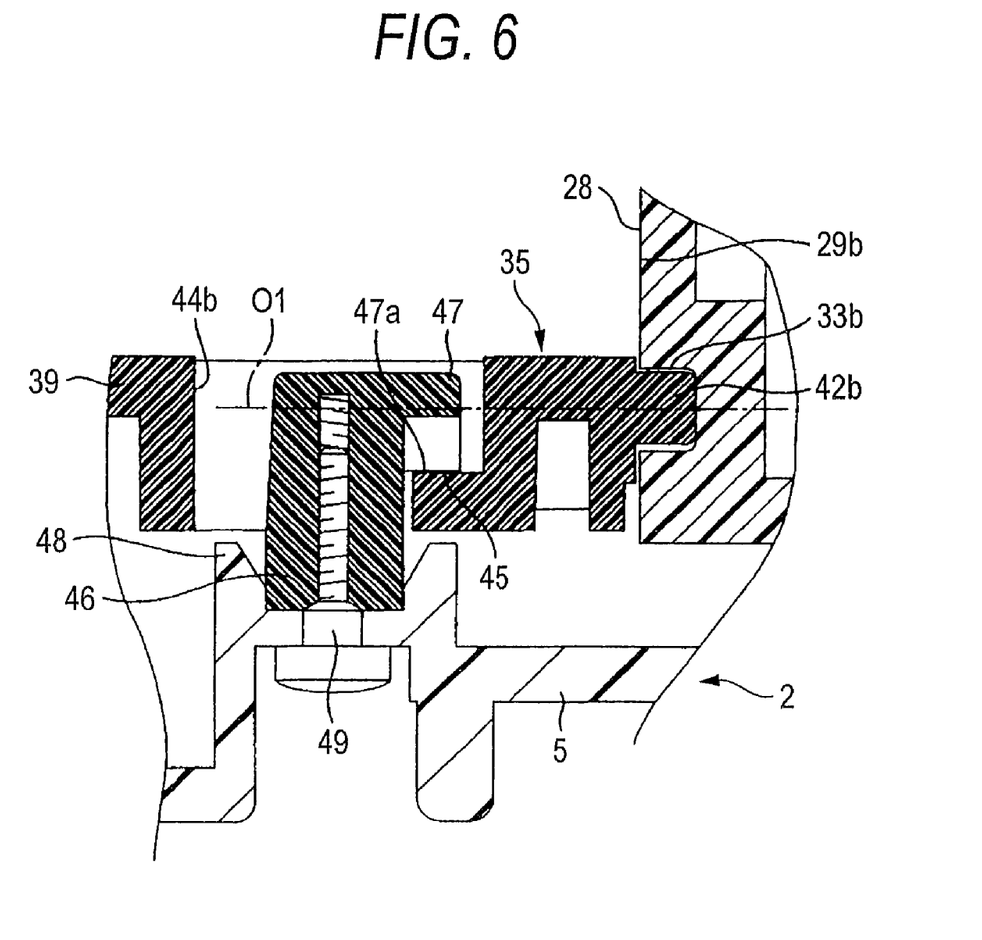
FIG. 6 is an enlarged sectional view showing an F6 part in FIG. 5.

As shown in FIGS. 5, 6, and 8, a pair of fitting holes 44a and 44b are formed through the base portion 39 of the lock lever 35. One fitting hole 44a is adjacent to one guide shaft 42a. The other fitting hole 44b is adjacent to the other guide shaft 42b. A guide surface 45 is formed inside each of the fitting holes 44a and 44b. The guide surface 45 is formed in an arc shape so as to be on the same axis along with the guide shafts 42a and 42b.

Figure 7:
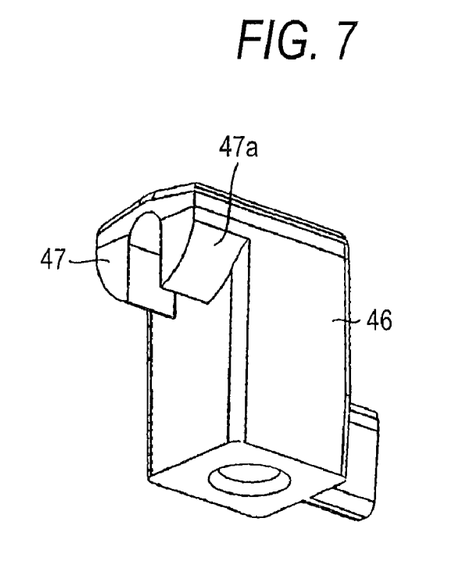
FIG. 7 is a perspective view showing a fixing piece for allowing the lock lever to be rotatably supported by the base in the embodiment of the invention.

A fixing piece 46 shown in FIG. 7 is each fitted into the inside of the fitting holes 44a and 44b. A protrusion portion 47 protruding from the guide surface 45 is formed on one end of the fixing piece 46. The protrusion portion 47 includes an outer peripheral surface 47a opposed to the guide surface 45. The outer peripheral surface 47a is curved in an arc shape so as to correspond to the curvature of the guide surface 45.

The lower ends of the fixing pieces 46 fitted into the fitting holes 44a and 44b collide with an attachment sheet 48 formed on the lower plate 5 of the base 2 through the fitting holes 44a and 44b. Each lower end of the fixing piece 46 is fixed to the attachment sheet 48 by a bolt 49.

With such a fixing operation, the outer peripheral surface 47a of the fixing piece 46 is slidably pressed on the guide surface 45 of the lock lever 35. For this reason, the lock lever 35 is rotatably supported by the bottom plate 5 of the base 2 using the outer peripheral surface 47a of the fixing piece 46 as a guide surface. The center of the rotation of the lock lever 35 is positioned at the rotation center line O1 of the guide shafts 42a and 42b.

One arm portion 40a of the lock lever 35 extends from one end of the base portion 39 toward the opposite side of the push button 41 and is adjacent to the one side surface 29a of the concave portion 28. Similarly, the other arm portion 40b of the lock lever 35 extends from the other end of the base portion 39 toward the opposite side of the push button 41 and is adjacent to the other side surface 29b of the concave portion 28.

Claws 51a and 51b are formed on the front ends of the arm portions 40a and 40b. The claws 51a and 51b are configured to selectively engage with any one of the engagement portions 38 of the base 2. The front surfaces of the claws 51a and 51b are inclined so as to follow the front edge 38a of the engagement portion 38.

In this way, the lock lever 35 is rotatably supported by the base 2 between an engagement position in which the claws 51a and 51b are hung on one of the engagement portions 38 of the base 2 and an engagement releasing position in which the claws 51a and 51b are upwardly detached from the engagement portion 38.

A pair of compressed springs 52 are interposed between the push button 41 of the lock lever 35 and the bottom plate 5 of the base 2. The compressed coil spring 52 is an example of an elastic member and allows the lock lever 35 to be normally urged toward the engaging position. Accordingly, the claws 51a and 51b of the lock lever 35 engage with any one of the engagement portions 38.

Figure 12:
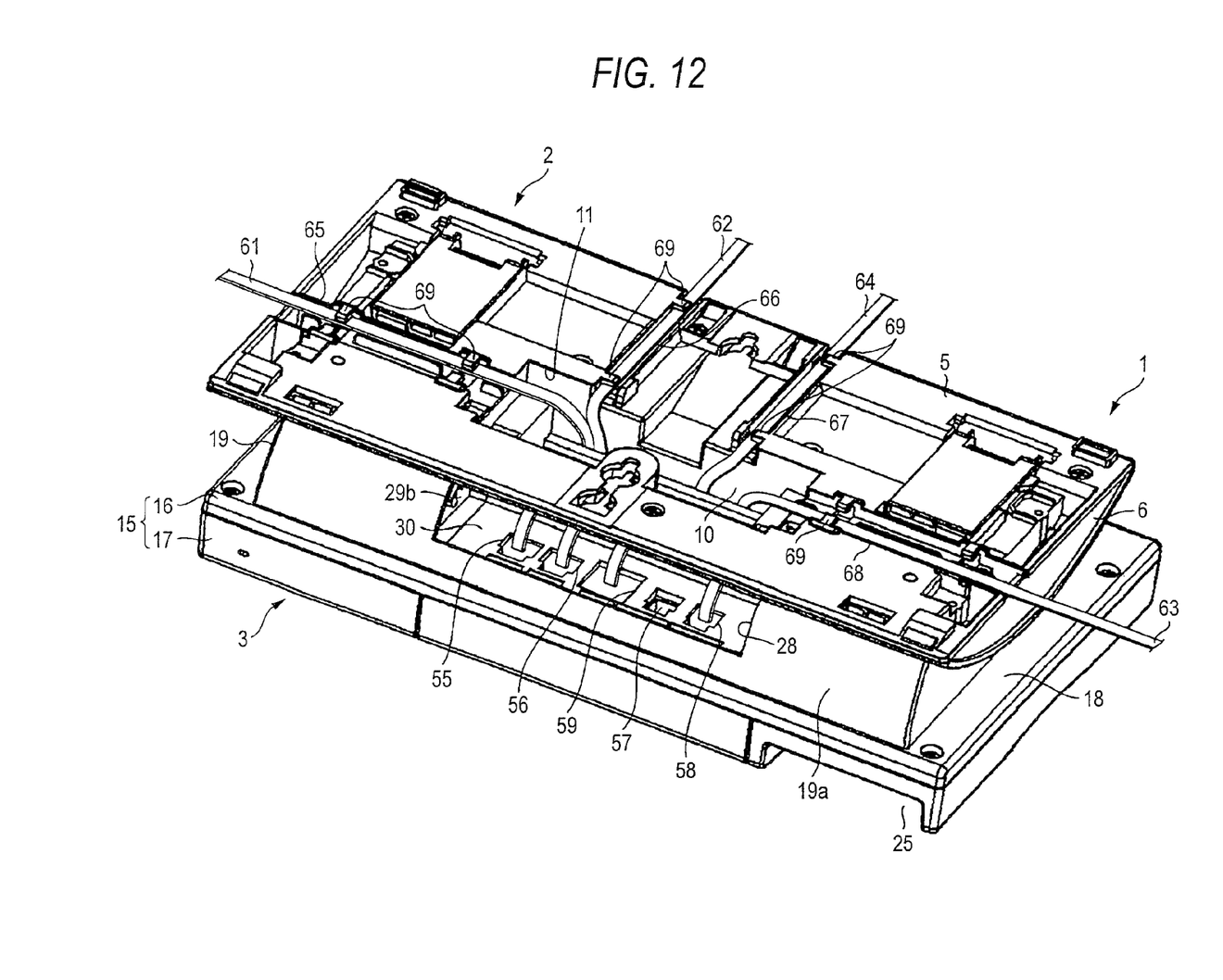
FIG. 12 is a perspective view showing the telephone indicating a wiring path of a cable with respect to the base in the embodiment of the invention.
Figure 13:
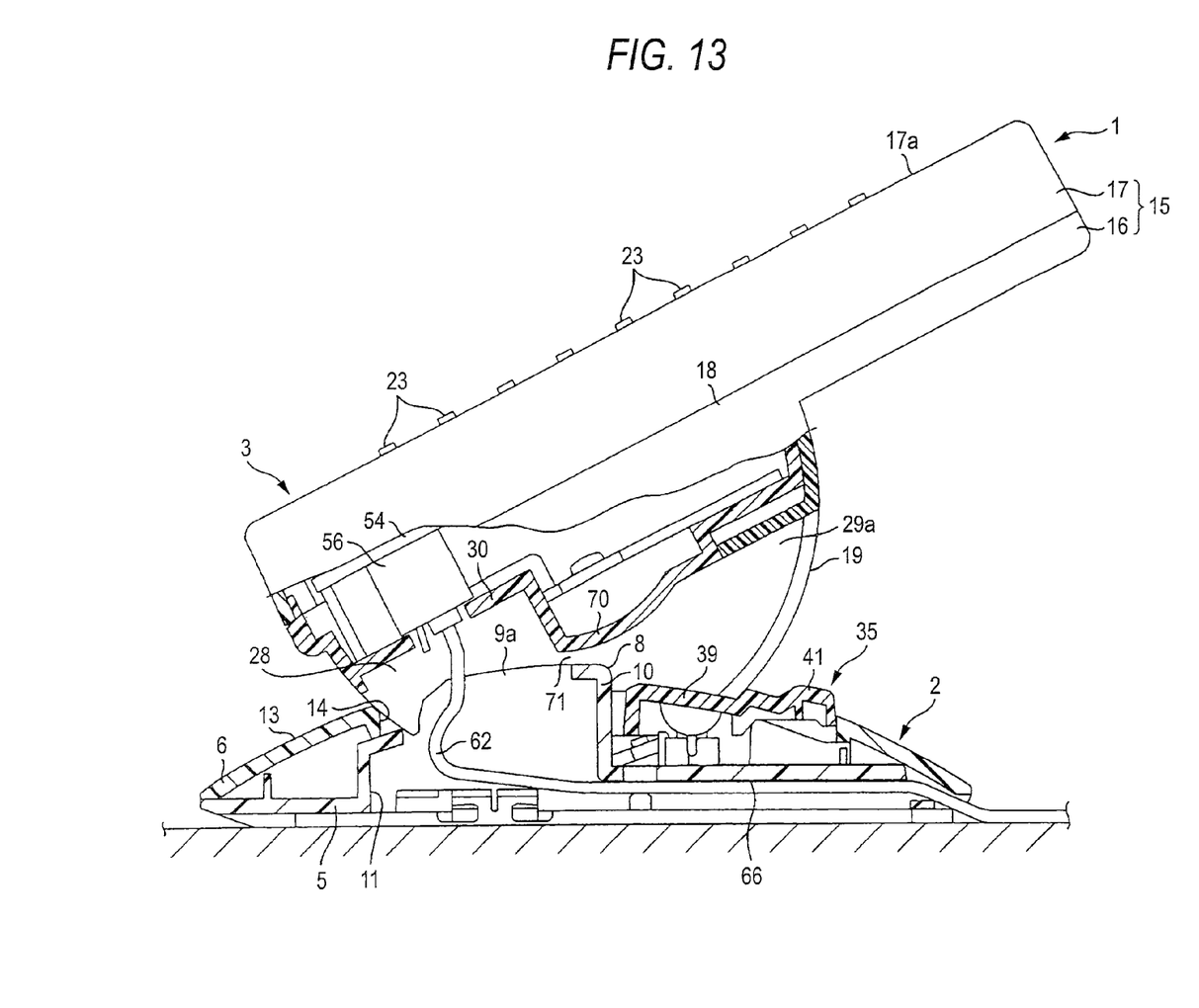
FIG. 13 is a sectional view showing the telephone indicating the wiring path of the cable with respect to the base in the embodiment of the invention.

As shown in FIGS. 9 and 13, a print circuit board 54 is contained in the housing 15 of the main body 3. The print circuit board 54 is disposed in a direction horizontal to the upper surface 17a of the top cover 17. First to fourth modular jacks 55, 56, 57, and 58 and a single connector 59 are mounted on the lower surface of the front end portion of the print circuit board 54 (see FIG. 12). The first to fourth modular jacks 55, 56, 57, and 58 and the single connector 59 are arranged in a row in the width direction of the main body 3, and exposed on the ceiling surface 30 of the concave portion 28. The connector 59 is disposed between the second modular jack 56 and the third modular jack 57.

The first modular jack 55 is provided for being connected to an add-on module connection cable 61. The second modular jack 56 is provided for being connected to a telephone line connection cable 62. The third modular jack 57 is provided for being connected to a head set connection cable (not shown), and FIG. 12 shows that the head set connection cable is separated from the third modular jack 57. The fourth modular jack 58 is provided for being connected to a hand set connection cable 63. In addition, the connector 59 is provided for being connected to an external speaker connection cable 64.

The cables 61, 62, and 63 connected to the modular jacks 55, 56, and 58 and the cable 64 connected to the connector 59 are drawn from the ceiling surface 30 of the concave portion 28 to the inside of the concave portion 28 and drawn to the opposite surface of the bottom plate 5 of the base 2 via the through-hole 11.

First to fourth wiring grooves 65, 66, 67, and 68 are formed on the opposite surface of the bottom plate 5 of the base 2. The first wiring groove 65 extends from the opening end of the through-hole 11 to the right edge of the bottom plate 5. The second and third wiring grooves 66 and 67 extends from the opening end of the through-hole 11 to the rear edge of the bottom plate 5 and disposed in parallel each other while being apart from each other in the width direction of the base 2. The fourth wiring groove 68 extends from the opening end of the through-hole 11 to the left edge of the bottom plate 5.

The add-on module connection cable 61 is drawn from the through-hole 11 to the right side of the base 2 via the first wiring groove 65. The telephone line connection cable 62 is drawn from the through-hole 11 to the rear side of the base 2 via the second wiring groove 66. Similarly, the external speaker connection cable 64 is drawn from the through-hole 11 to the rear side of the base 2 via the third wiring groove 67. The hand set connection cable 63 is drawn to the left side of the base 2 via the fourth wiring groove 68 and drawn by the hand set 4.

According to the embodiment, a plurality of clamps 69 are formed on the opening edge of the first to fourth wiring grooves 65 to 68. The clamps 69 holds the cables 61 to 64 in the first to fourth wiring grooves 65 to 68.

As shown in FIGS. 12 and 13, the upright wall 10 protruding from the bottom plate 5 of the base 2 is positioned in rear of the cables 61 to 64. The upper end of the upright wall 10 slightly protrudes from the opening 14 of the upper wall 13 of the base 2.

A swelling portion 70 protruding downward is formed on the ceiling surface 30 of the concave portion 28 opposed to the upper wall 13 of the base 2. The swelling portion 70 is positioned in the rear of the cables 61 to 64. The lower end of the swelling portion 70 is adjacent to the upper end of the upright wall 10, and a small gap 71 for allowing the tilting of the main body 3 is formed between the lower end of the swelling portion 70 and the upper end of the upright wall 10.

For this reason, the upright wall 10 and the swelling portion 70 together cover the cables 61 to 64 passing through the concave portion 28 from the rear side of the telephone 1. Accordingly, even when the rear side of the ceiling surface 30 of the concave portion 28 is inclinedly lifted and the opening 14 of the base 2 is thereby largely opened to the rear side of the telephone 1 in the same case, as the main body 3 is tilted upward, the cables 61 to 64 are hardly seen from the rear side of the telephone 1.

In the telephone 1 having such a configuration, a procedure by which the tilt angle of the main body 3 varies will be described.

FIG. 9 shows that the main body 3 is in a horizontal posture, that is, the tilt angle is 0°. When the main body 3 is in the horizontal posture, the claws 51a and 51b of the lock lever 35 engage with the second engagement portions 38 among the five engagement portions 38 formed on the side surfaces 29a and 29b of the concave portion 28.

Figure 10:
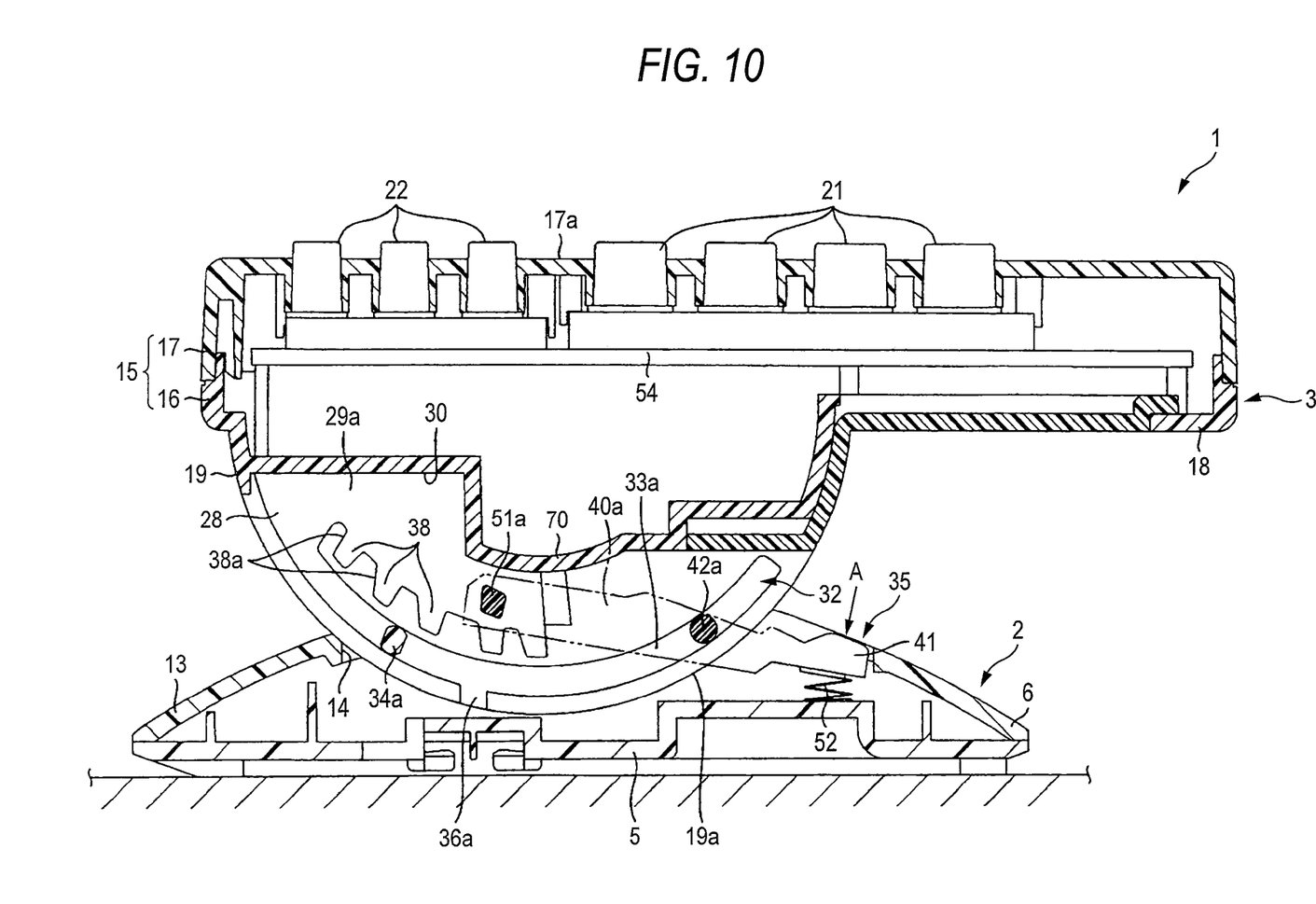
FIG. 10 is a sectional view showing the telephone in the state where a locking of the main body using the lock lever is released in the embodiment of the invention.

In order to change the tilt angle of the main body 3, first the push button 41 of the first lock lever 35 is pressed in arrow A direction in FIG. 10 by using a fingertip. In this way, the lock lever 35 rotates upward about the guide shafts 42a and 42b from the engagement position to the engagement releasing position, and the claws 51a and 51b of the lock lever 35 are separated from the second engagement portion 38.

As a result, the fixed angle of the main body 3 is released and the main body 3 may be tilted at any angle along the guide grooves 33a and 33b of the main body 3 as long as the push button 41 of the lock lever 35 is pressed.

For example, when the pressing operation of the lock lever 35 is released after upwardly rotating the main body 3 from the horizontal posture to 40° by pressing the lock lever 35, the lock lever 35 rotates from the engagement releasing position to the engagement position due to an urging force of the compressed coil spring 52. With such a rotation, as shown in FIG. 11 the claws 51a and 51b of the lock lever 35 elastically engage with the fifth engagement portion 38. As a result, the main body 3 is maintained at the tilt angle of 40°.

In such a telephone 1, the concave portion 28 is formed on the leg section 19 of the main body 3 that is inserted through the opening 14 of the base 2 in such a manner that the outer peripheral surface 19a is cut out to be opened. In addition, the guide grooves 33a and 33b for guiding the tilting operation of the main body 3 are formed on the side surfaces 29a and 29b of the concave portion 28. Further, the shafts 34a and 34b protruding toward the side surfaces 29a and 29b are formed inside of the opening 14 of the base 2, and the shafts 34a and 34b are allowed to be slidably fitted into the guide grooves 33a and 33b inside the concave portion 28.

For this reason, the guide grooves 33a and 33b for guiding the tilting operation of the main body 3 along with the shafts 34a and 34b are configured to be normally stopped inside the concave portion 28 even when the tilt angle of the main body 3 varies. Accordingly, the guide grooves 33a and 33b or the shafts 34a and 34b are not directly exposed on the base 2. In addition, the guide grooves 33a and 33b or the shafts 34a and 34b are hardly seen from the outside of the telephone 1.

Further, a plurality of engagement portions 38 engaging with the claws 51a and 51b or the lock lever 35 are formed the side surfaces 29a and 29b of the concave portion 28 so as to be adjacent to the guide grooves 33a and 33b. For this reason, the engagement portion 38 is configured to be normally stopped inside the concave portion 28 even when the tilt angle of the main body 3 varies. Accordingly, the engagement portion 38 or the claws 51a and 51b are not directly exposed on the base 2, and the engagement portion 38 or the claws 51a and 51b are hardly seen from the outside of the telephone 1.

As a result, even when the main body 3 is maintained at any tilt angle in the range of 0° to 40°, the good appearance of the telephone 1 can be maintained, thereby improving the value of commodities.

In addition, according to the embodiment, the various cables 61 to 64 that pass through the inside of the concave portion 28 and are drawn by the first to fourth wiring grooves 65 to 68 in rear of the base 2 are covered from the rear side of the telephone 1 by the upright wall 10 protruding upward from the bottom plate 5 of the base 2 and the swelling portion 70 protruding from the ceiling surface 30 of the concave portion 28. For this reason, as shown in FIG. 13, even when the rear portion of the ceiling surface 30 of the concave portion 28 is inclinedly lifted and the concave portion 28 is thereby largely opened to the rear side of the telephone 1 in the same case, as the main body 3 is tilted upward, the cables 61 to 64 passing through the inside of the concave portion 28 are hardly seen from the rear side of the telephone 1.

Accordingly, the appearance of the telephone 1 becomes good when viewed from the rear side of the telephone 1, which effectively contributes to improving the value of commodities of the telephone 1.

In addition, the shaft 34a of the base 2 and the guide shaft 42a of the lock lever 35 are slidably fitted into the guide groove 33a of one side surface 29a of the concave portion 28, and the shaft 34a and the guide shaft 42a are spaced to each other in the groove direction of the guide groove 33a. Similarly, the shaft 34b of the base 2 and the guide shaft 42b of the lock lever 35 are slidably fitted into the guide groove 33b of the other side surface 29b of the concave portion 28, and the shaft 34b and the guide shaft 42b are spaced from each other in the groove direction of the guide groove 33b.

In other words, the side surfaces 29a and 29b of the concave portion 28 of the main body 3 are supported by the base 2 at two positions which are spaced from each other in the groove direction of the guide grooves 33a and 33b. For this reason, when the main body 3 is tilted along the guide grooves 33a and 33b, the main body 3 is hardly inclined with respect to the axis line of the shafts 34a and 34b or the guide shafts 42a and 42b.

As a result, the main body 3 is allowed to be smoothly tilted along the guide grooves 33a and 33b, thereby easily adjusting the angle of the main body 3.

In addition, in the lock lever 35 according to the embodiment, the outer peripheral surface 47a of the fixing piece 46 defining the revolution center is positioned between the push button 41 and the claws 51a and 51b, and the lock lever 35 is tilted like a seesaw by pressing the push button 41. For this reason, the push button 41 may be farther apart from the revolution center of the lock lever 35, thereby enabling the push button 41 to be largely exposed to the rear side of the opening 14 of the base 2 in the same manner as specifically shown in FIG. 2.

Accordingly, the operability of pressing the lock lever 35 using a fingertip is improved and the angle of the main body 3 is easily adjusted.

In addition, according to the embodiment, the front edge 38a of the engagement portion 38 and the front surface of the claws 51a and 51b are inclined toward the front side of the telephone 1. For this reason, when the interlocked part of the engagement 38 and the claws 51a and 51b are overloaded due to the case where the main body 3 is tilted upward without pressing the push button 41 of the lock lever 35 by mistakes, a force for upwardly pressing the claws 51a and 51b is applied to the arm portions 40a and 40b of the lock lever 35.

As a result, the lock lever 35 rotates in a clockwise, as shown in FIG. 9, about the guide shafts 42a and 42b, and the claws 51a and 51b separate from the engagement portion 38. Accordingly, it is possible to prevent the engagement 38 and the claws 51a and 51b from being damaged.

The electronic apparatus having the tilting mechanism according to the invention is not limited the telephone described in the embodiment, but the invention may be also applied to other electronic apparatus such as an information terminal apparatus or a portable display apparatus.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A tilting mechanism comprising:
a fixed section including a guide surface depressed in an arc shape; and a plurality of shafts; and
a movable section having an outer peripheral surface curved in an arc shape that comes in contact with the guide surface of the fixed section and tilting along the guide surface, the movable section including a concave portion cut out to open the outer peripheral surface, wherein:
the concave portion includes: a pair of side surfaces opposed to each other; and guide grooves that are curved along a curvature of the outer peripheral surface of the movable section and are formed on the side surfaces; and
the plurality of shafts are slidably fitted into the guide grooves.

2. The tilting mechanism according to claim 1, wherein:
the fixed section includes an opening which the outer peripheral surface of the movable section is entered; and
the guide surface and the shaft are positioned inside the opening.

3. The tilting mechanism according to claim 1, wherein:
the movable section includes a plurality of cutouts that guide the shafts of the fixed section to the guide grooves; and
the cutouts open the outer peripheral surface of the movable section.

4. A tilting mechanism comprising:
a fixed section including: a pair of guide surfaces depressed in an arc shape; and a plurality of shafts positioned between the guide surfaces;
a movable section including: an outer peripheral surface curved in an arc shape that comes in contact with the guide surfaces of the fixed section; a concave portion that is cut out to open the outer peripheral surface and has a pair of side surfaces opposed to each other; guide grooves that are formed on the side surfaces of the concave portion and curved along a curvature of the outer peripheral surface of the movable section and that allow the shafts to be slidably fitted thereto; and a plurality of engagement portions that are formed on the side surfaces of the concave portion and disposed at a predetermined interval in a longitudinal direction of the guide grooves; and
a lock member that is supported by the fixed section and revolvable between an engagement position at which the lock member selectively engages with the engagement portion and a disengagement position at which the lock member is disengaged from the engagement portion.

5. The tilting mechanism according to claim 4, wherein:
the lock member includes a pair of guide shafts;
the guide shafts are slidably fitted into the guide grooves at a position spaced from the shafts of the fixed section in a longitudinal direction of the guide grooves; and
a revolution center of the lock member is positioned on a center line of the guide shafts.

6. The tilting mechanism according to claim 4, wherein:
the lock member includes: a base portion including a push button to be manually operated; and a pair of arm portions protruding from the base portion;
a pair of guide shafts that are slidably fitted into the guide grooves are formed on the base portion; and
claws that selectively engage with the engagement portions on the side surfaces of the fixed section are formed on the arm portions.

7. The tilting mechanism according to claim 6, wherein:
the guide shafts are slidably fitted into the guide grooves at a position spaced from the shafts of the fixed section in a longitudinal direction of the guide grooves; and
the revolution center of the lock member is positioned on the center line of the guide shafts.

8. The tilting mechanism according to claim 6, wherein:
the lock member is positioned between the side surfaces of the concave portion; and
a push button of the lock member is exposed from the concave portion.

9. The tilting mechanism according to claim 4, wherein
the lock member is normally urged to the engagement position with an elastic member interposed therebetween.

10. An electronic apparatus comprising:
a base including: a pair of guide surfaces depressed in an arc shape; and a plurality of shafts positioned between the guide surfaces;
a main body including: an outer peripheral surface curved in an arc shape that comes in contact with the guide surfaces of the base; a concave portion cut out to open the outer peripheral surface and includes a pair of side surfaces opposed to each other; guide grooves that are formed on the side surfaces of the concave portion and curved along a curvature of the outer peripheral surface of the main body and that allow the shafts to be slidably fitted thereto; and a plurality of engagement portions that are formed on the side surfaces of the concave portion and disposed at a predetermined interval in a longitudinal direction of the guide grooves; and
a lock member that is supported by the base and revolvable between an engagement position at which the lock member selectively engages with the engagement portion and a disengagement position at which the lock member is disengaged from the engagement portion.

11. The electronic apparatus according to claim 10, wherein:
the lock member includes a base including a push button to be manually operated; and a pair of arm portions protruding from the base;
a pair of guide shafts that are slidably fitted into the guide grooves are formed on the base;
claws that selectively engage with the engagement portions on the side surfaces of the fixed section are formed on the arm portions; and
the guide shafts are slidably fitted into the guide grooves at the position spaced from the shafts of the fixed section in a longitudinal direction of the guide grooves and the revolution center of the lock member is positioned on the center line of the guide shafts.

12. The electronic apparatus according to claim 10, wherein:
the base includes an opening formed at a position opposed to the concave portion of the main body; and
the main body includes a connector to which a cable is connected on the front end of the concave portion and the cable is drawn from an inside of the concave portion to a bottom of the base via the opening.

13. The electronic apparatus according to claim 12, wherein:
the main body includes a convex portion protruding from an inner surface of the concave portion to the opening of the base;
the base includes an upright wall protruding from the bottom of the base to the concave portion of the main body; and
the convex portion and the upright wall are opposed to each other in rear of the cable.

14. The electronic apparatus according to claim 13, wherein
a gap that allows a tilt displacement of the main body is formed between the lower end of the convex portion and the upper end of the upright wall.

* * * * *